United States Patent
Hunsaker et al.

(10) Patent No.: US 11,086,812 B2
(45) Date of Patent: Aug. 10, 2021

(54) PLATFORM ENVIRONMENT CONTROL INTERFACE TUNNELING VIA ENHANCED SERIAL PERIPHERAL INTERFACE

(71) Applicant: Intel Corporation, Santa Clara, CA (US)

(72) Inventors: Mikal C. Hunsaker, El Dorado Hills, CA (US); Shaun M. Conrad, El Dorado Hills, CA (US); Zhenyu Zhu, Folsom, CA (US); Navtej Singh, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1023 days.

(21) Appl. No.: 14/998,222

(22) Filed: Dec. 26, 2015

(65) Prior Publication Data

US 2017/0185559 A1 Jun. 29, 2017

(51) Int. Cl.
| | | |
|---|---|---|
| *G06F 13/42* | (2006.01) | |
| *G06F 13/362* | (2006.01) | |
| *G06F 13/40* | (2006.01) | |

(52) U.S. Cl.
CPC ........ *G06F 13/4282* (2013.01); *G06F 13/362* (2013.01); *G06F 13/4068* (2013.01)

(58) Field of Classification Search
CPC . G06F 13/4282; G06F 13/362; G06F 13/4068
USPC .......... 710/105, 110; 370/437; 709/208, 253
See application file for complete search history.

(56) References Cited

U.S. PATENT DOCUMENTS

| | | | |
|---|---|---|---|
| 8,904,079 B2 | 12/2014 | Chang et al. | |
| 2003/0018824 A1* | 1/2003 | Ponticelli | H04L 12/403 709/253 |
| 2007/0258478 A1* | 11/2007 | Wu | H04J 3/0608 370/437 |
| 2009/0292845 A1* | 11/2009 | Buttner | H04L 12/423 710/110 |
| 2012/0117429 A1 | 5/2012 | Zhang | |
| 2013/0238918 A1 | 9/2013 | Haj-Yihia | |
| 2014/0122834 A1 | 5/2014 | Ganguli et al. | |
| 2014/0195704 A1* | 7/2014 | Bhatia | G06F 13/42 710/105 |
| 2014/0201301 A1* | 7/2014 | Bradley | G06F 8/665 709/208 |

(Continued)

FOREIGN PATENT DOCUMENTS

| | | |
|---|---|---|
| WO | 2015023254 A1 | 2/2015 |
| WO | 2015141014 A1 | 9/2015 |
| WO | 2017112329 A1 | 6/2017 |

OTHER PUBLICATIONS

International Search Report and Written Opinion in International Application No. PCT/US2016/063736 dated Mar. 8, 2017.

*Primary Examiner* — Idriss N Alrobaye
*Assistant Examiner* — Henry W Yu
(74) *Attorney, Agent, or Firm* — Alliance IP, LLC

(57) ABSTRACT

An embedded controller is provided for a computer, including a processor, first one or more logic elements providing a serial peripheral interface (SPI) module to communicatively couple the embedded controller to an SPI bus as an SPI slave, and second one or more logic elements providing a platform environment control interface (PECI)-over-SPI engine, to build an SPI packet providing an encapsulated PECI command and send a notification to an SPI master that the packet is available.

26 Claims, 8 Drawing Sheets

(56) References Cited

U.S. PATENT DOCUMENTS

2015/0355696 A1   12/2015   Pamley et al.

* cited by examiner

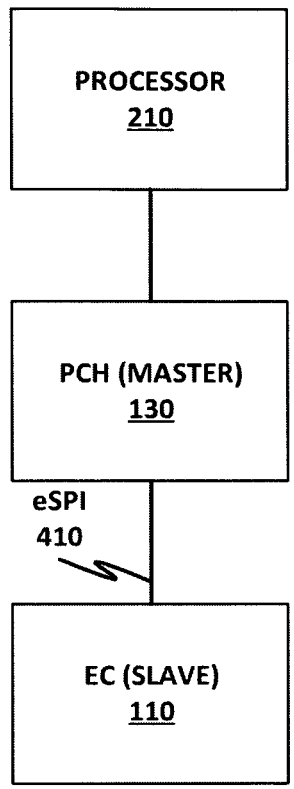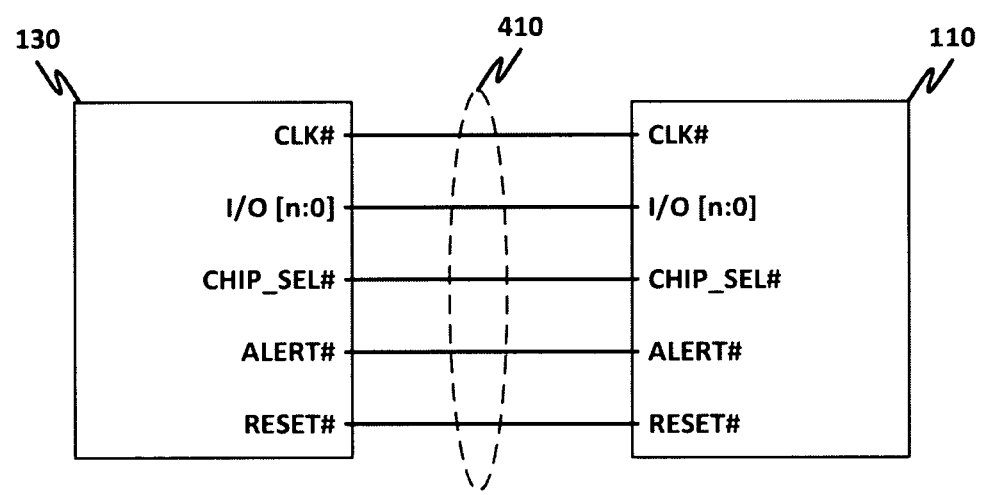
Fig. 4

PLATFORM ENVIRONMENT CONTROL INTERFACE TUNNELING VIA ENHANCED SERIAL PERIPHERAL INTERFACE

FIELD

This disclosure relates in general to the field of computer architecture, and more particularly, though not exclusively to, a system and method for providing platform environment control interface tunneling via an enhanced serial peripheral interface.

BACKGROUND

Most modern computing systems, especially personal computers, servers, and other motherboard-based systems, include a "chipset." The chipset may be an integrated circuit, often located on the motherboard, to manage data flow between the processor, memory, and peripherals. The chipset may be specially configured to work with a particular processor or processor family, such as Intel® Core™ multi-core processors. Because communications between the processor and peripherals pass through the chipset, it can significantly influence system performance, and may become a performance bottleneck if it encounters workloads that it cannot handle.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIG. 4 is a block diagram of selected elements of a computing device, including communication without a separate PECI bus according to one or more examples of the present specification;

DETAILED DESCRIPTION

Figure 1:
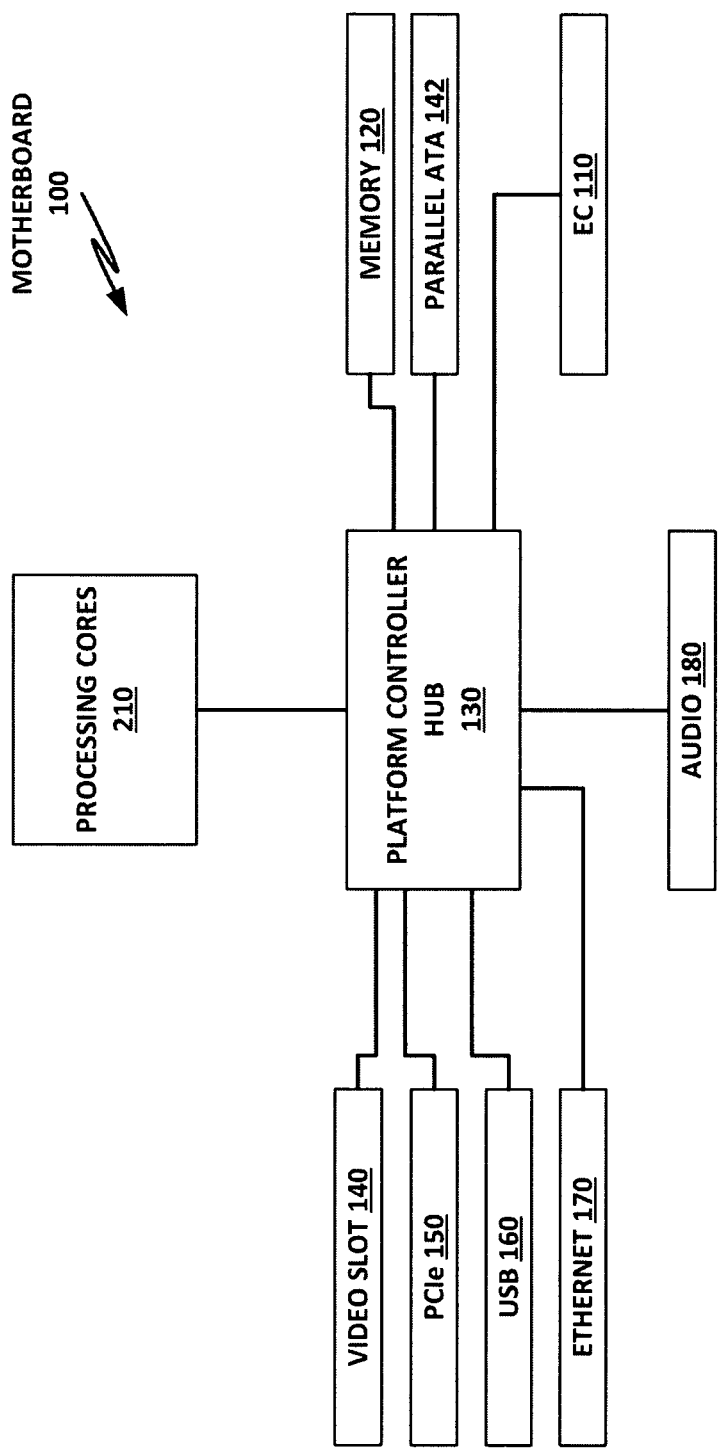
FIG. 1 is a block diagram of selected elements of a computer motherboard according to one or more examples of the present specification.

In an example, there is disclosed an embedded controller for a computer, including: a processor; first one or more logic elements providing a serial peripheral interface (SPI) module to communicatively couple the embedded controller to an SPI bus as an SPI slave; second one or more logic elements providing a platform environment control interface (PECI)-over-SPI engine, to: build an SPI packet including an encapsulated PECI command; and send a notification to an SPI master that the packet is available.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

An embedded controller (EC) is a special processor or microcontroller in a computing system that handles certain tasks not commonly handled by the operating system (OS). EC tasks may include the following, by way of nonlimiting example:

a. Handling keyboard inputs, and inputs from other buttons and switches, such as the power button or keyboard lid.
  b. Powering the computer up or down.
  c. Handling some system buses
  d. Thermal measurement, and resulting activities, such as fan control, CPU throttling, or in extreme cases, emergency system shutdown.
  e. Control of visible LEDs.
  f. Batter charging and discharging algorithms and management.
  g. Remote network diagnostics.
  h. Resetting the system on a command from software.
  i. Operating an OS-independent watchdog timer to help recover from runaway software errors.

An example embedded controller has its own memory, such as random access memory (RAM), and may also have instructions stored on a nonvolatile computer-readable storage medium, such as a read-only memory (ROM) or flash memory.

In certain embodiments, the EC is always on when the system is powered on. It may communicate with other system components via several methods, depending on the function, including ACPI, SMBus, shared memory, and platform environment control interface (PECI) bus.

The present specification describes, inter alia, a novel thermal and system interface to provide improved telemetry, thermal management, and system management, by way of nonlimiting example. Specifically, in one embodiment, PECI services may be tunneled via an enhanced Serial Parallel Interface (eSPI) to provide both improved speed and functionality, In certain existing architectures, a separate single-wire PECI bus is provided. This may run at a relatively slow clock rate, such as 1 MHz, and thus has limited bandwidth and may present latency issues. Advantageously, the PECI-over-eSPI tunneling of the present specification may enable improvements, including by way of nonlimiting example:

a. Higher bandwidth and fast responsiveness to PECI and other system management services.
  b. Reduced pin count by removing the legacy PECI bus wire.

c. Reduced platform cost and complexity by removal of external components, including a complicated bidirectional level shifter.

d. Reduced validation and debug costs related to the legacy PECI interface.

Platform environment control interface (PECI) is an existing standards-based interface that provides a communication channel to external monitoring or control devices. For example, PECI may be used for thermal management in systems such as Intel® Core™ microprocessors. PECI may use on-die digital thermal sensors (DTS) that may be configured to provide digital thermal data while the processor is operating. PECI may communicate these data to the processor via a single wire PECI bus, which may have a variable bandwidth, but in general is not above approximately 2 Mbit/s.

In one nonlimiting example, PECI provides to the processor a negative number representing how far below the thermal "throttle point" the processor is currently operating. If the CPU reaches the throttle point, then it may reduce its clock speed to avoid overheating. Thus for example, if the processor's throttle point—the temperature at which it is to throttle its clock speed—is 85° C., and the processor is currently 65° C., then the PECI reports a value of −20.

The present specification describes a method for providing PECI messaging over and eSPI interface. This allows the EC to take advantage of the higher throughput and speeds of the eSPI interface without suffering any loss of functionality.

In an example method, the EC includes a PECI-over-eSPI engine that permits it to use eSPI as a proxy for PECI messaging. The PECI-over-eSPI engine may format an eSPI out of band (OOB) packet, and may notify an eSPI master, such as a platform controller hub (PCH), that the OOB packet is available. The PCH, in its turn, may include a PECI-over-eSPI master engine. The PECI-over-eSPI master engine may fetch the packet from the EC, and forward the packet to the processor. Depending on the message, the PCH may then receive a response back from the processor. Optionally, the PECI-over-eSPI master engine may reformat the response for use on the eSPI bus, and then use the eSPI PUT_OOB function to send the response to the EC.

Advantageously, the eSPI bus may be configured to operate at a speed several times faster than the legacy PECI bus. Further advantageously, PECI-over-eSPI tunneling removes the necessity of a separate PECI wire, which frees up additional routing space on the motherboard, and eliminates the need for a bi-directional level shifter between the PECI and the processor.

A system and method for PECI tunneling via eSPI will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of selected components of a motherboard 100 according to one or more examples of the present specification. It should be noted that motherboard 100 of FIG. 1 discloses only selected components, and is not intended to be an exhaustive block diagram of all possible components of a motherboard. Rather, the illustrated components are provided to illustrate the operational environment and context of the present specification.

In this example, motherboard 100 includes one or more processing cores (or a single processor) 210. Processing cores 210 are described in additional detail in FIG. 2. Thus, reference is made to FIG. 2 for additional details of the function and configuration of processor 210.

Motherboard 100 also includes a platform controller hub (PCH) 130. PCH 130 controls certain data paths and support functions, including for example the system clock. As of the date of this application, PCH 130 is a relatively new architecture. Previously, a "northbridge" and "southbridge" were provided on many motherboards. In newer embodiments, many of the features of the northbridge have been integrated into processor 210, while may features of the southbridge are provided by PCH 130. While a PCH 130 is a specific name for a fairly specific type of integrated circuit (1C) provided on many contemporary motherboards, it should be understood that the term PCH, as used throughout this specification and the claims, is intended to encompass both an exact PCH, as well as any suitable IC, circuit, or component that provides an equivalent functionality.

Several subsystems or controllers may be communicatively coupled to PCH 130. Each of these may be or comprise a controller microchip that provides suitable instructions, along with, in appropriate circumstances, plug-in slots to receive additional modules.

For example, video slot 140 may include a serial controller for receiving a video card, along with a slot for receiving the video card. Note that this could be a dedicated graphics port, such as accelerated graphics port (AGP) or a successor, or a general-purpose port, such as peripheral component interconnect express (PCIe) slot.

PCIe controller 150 may include a PCIe controller chip, on-board devices that communicate via PCIe, and one or more slots for receiving a PCIe card. PCIe is a high-speed serial expansion bus for adding peripherals and other devices to computers that is nearly ubiquitous in contemporary personal computers.

Similarly, universal serial bus (USB) controller 160 may include a USB controller chip that provides USB controller logic, one or more onboard microchips that communicate via USB, and one or more USB slots for receiving pluggable USB devices. USB is a high-speed, standards-compliant serial interface with differential signaling that is often used for connecting external devices.

Ethernet controller 170 may be an onboard Ethernet controller, which may communicate, for example, via PCIe 150. In one embodiment, Ethernet controller 170 is simply an open PCIe or USB slot that is configured to receive an Ethernet or other network card.

Audio controller 180 may be an onboard audio card integrated with motherboard 100, which may communicate via a suitable bus such as PCIe 150, or USB 160. In other examples, audio controller 180 may be an expansion audio card that plugs into a free PCIe slot.

Memory controller 120 may be a memory controller chip, along with one or more slots for plugging in a suitable memory, such as dual in-line memory modules (DIMM) or similar.

Parallel ATA 142 may be provided to enable attaching storage devices such as hard drives, flash drives, or optical media drives. Parallel ATA 142 may include a parallel ATA controller chip, along with one or more pluggable slots.

In certain embodiments, video slot 140, PCIe controller 150, USB controller 160, Ethernet controller 170, audio controller 180, memory controller 120, and parallel ATA 142, are provided for context and to illustrate the setting in which the system and devices of the present specification reside.

In this example, EC 110 communicates with one or more processing cores 210 via PCH 130. EC 110 is illustrated with greater detail in FIG. 5.

It should be understood that motherboard 100 is provided by way of nonlimiting example only. A "motherboard" may call to mind an expandable board with pluggable slots and expansion capabilities, such as may be found in a PC or server computer. However, this is not intended to be limiting. In some examples, a computer may be provided as a single board computer, a system-on-a-chip, or in some other suitable architecture. The system-on-a-chip architecture is particularly common in massively parallel processing systems, where a large number of identical compute nodes are provided on single chips, and networked together to perform massively parallel computational tasks. In such cases, some or all of the subsystems disclosed in FIG. 1 of motherboard 100 may be provided, including EC 110 and PCH 130. The present specification is not intended to be limited to a motherboard with expansion slots.

Figure 2:
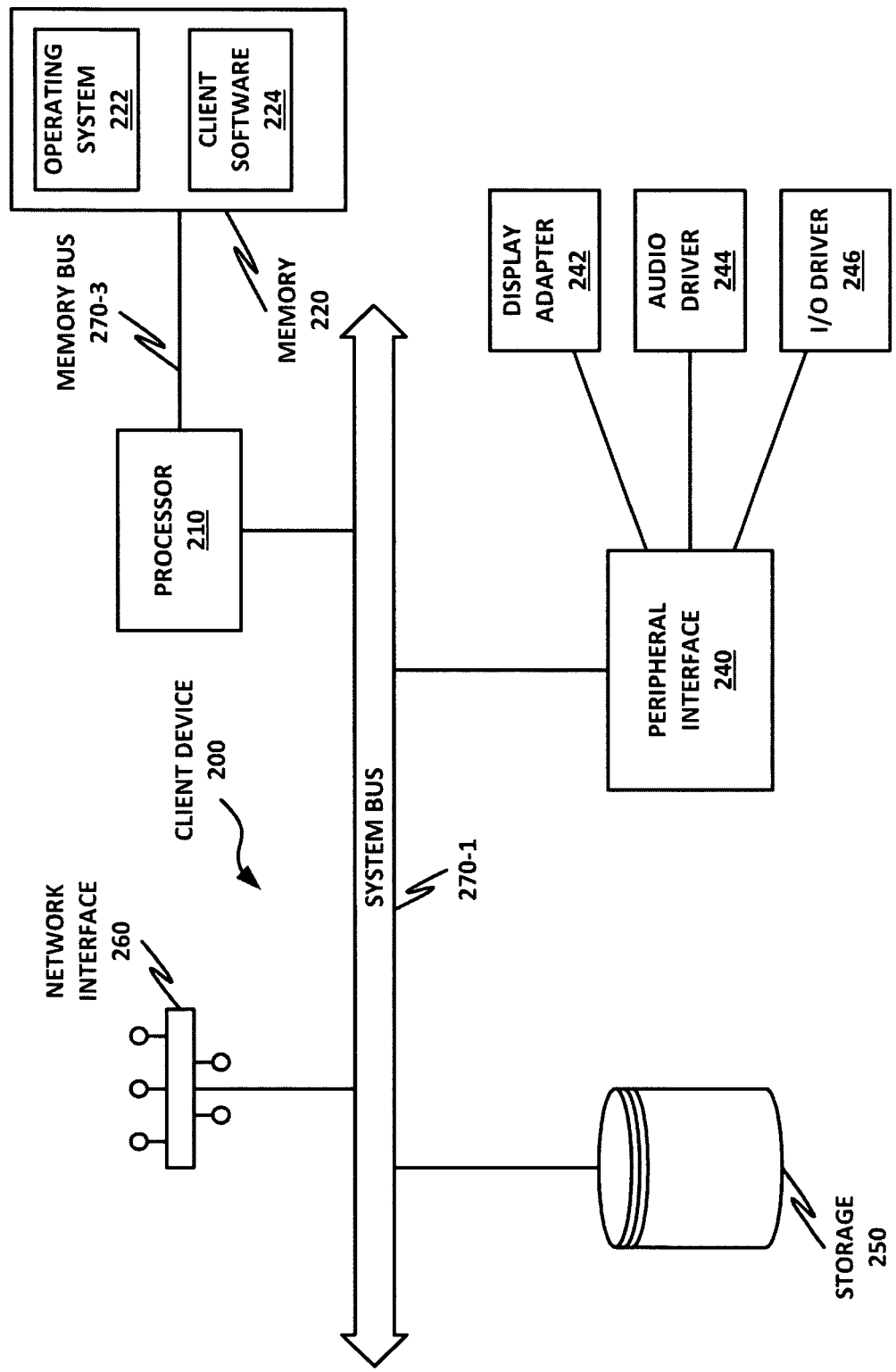
FIG. 2 is a block diagram of a computing device according to one or more examples of the present specification.

FIG. 2 is a block diagram of computing device 200 according to one or more examples of the present specification. Computing device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. In some embodiments, computing device 200 may be based around motherboard 100 of FIG. 1.

Computing device 200 includes a processor 210 connected to a memory 220, having stored therein executable instructions for providing an operating system 222 and at least software portions of a client software 224. Other components of computing device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces for performing its logical operation, and may rely on a software driver to provide additional logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of client software 224. Many other configurations are also possible, and are intended to be encompassed within the broad scope of this specification.

Network interface 260 may be provided to communicatively couple computing device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Client software 224, in one example, is operable to carry out computer-implemented methods as described in this specification. Client software 224 may include one or more tangible non-transitory computer-readable mediums having stored thereon executable instructions operable to instruct a processor to provide a client software 224. As used throughout this specification, an "engine" includes any combination of one or more logic elements, of similar or dissimilar species, operable for and configured to perform one or more functions performed by the engine. Thus, client software 224 may comprise one or more logic elements configured to perform methods as disclosed in this specification. In some cases, client software 224 may include a special integrated circuit designed to carry out a method or a part thereof, and may also include software instructions operable to instruct a processor to perform the method. In some cases, client software 224 may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that client software 224 may also include other hardware and software, including configuration files, registry entries, and interactive or user-mode software by way of non-limiting example.

In one example, client software 224 includes executable instructions stored on a non-transitory medium operable to perform a method according to this specification. At an appropriate time, such as upon booting computing device 200 or upon a command from operating system 222 or a user, processor 210 may retrieve a copy of the instructions from storage 250 and load it into memory 220. Processor 210 may then iteratively execute the instructions of client software 224 to provide the desired method.

Client software 224 may provide any software to enable a user to operate client device 200.

Peripheral interface 240 may be configured to interface with any auxiliary device that connects to computing device 200 but that is not necessarily a part of the core architecture of computing device 200. A peripheral may be operable to provide extended functionality to computing device 200, and may or may not be wholly dependent on computing device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Figure 3:
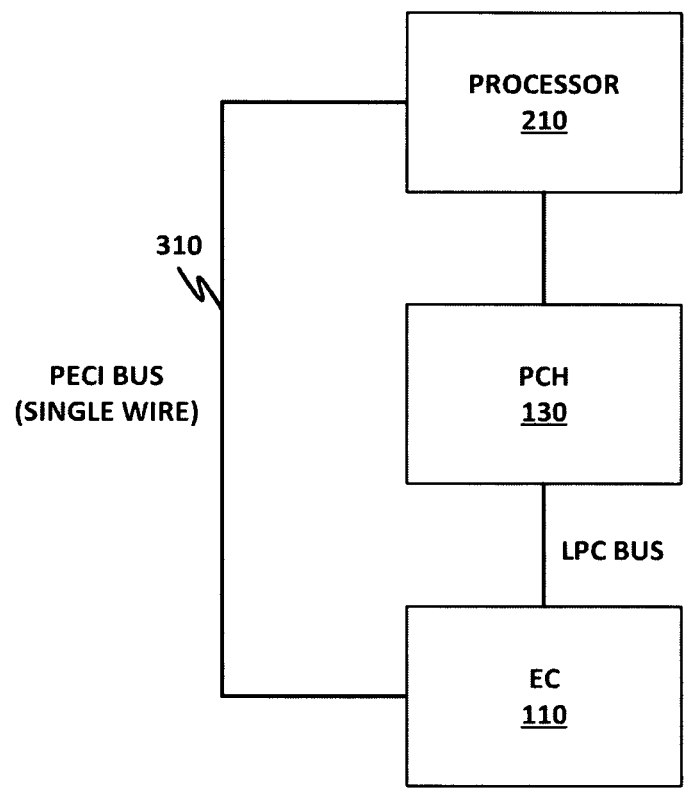
FIG. 3 is a block diagram of selected elements of a computing device, including communication via a PECI bus according to one or more examples of the present specification.

FIG. 3 is a simplified block diagram illustrating a communication path between EC 110 and processor 210.

In this example, EC 110 communicates with PCH 130 via a suitable technology, such as a low pin count (LPC) bus. PCH 130 may also communicate with processor 210 via LPC bus. Communications between EC 110 and PCH 130 via LPC bus may be considered in-band communications. These may be used for common functions, such as a keyboard drivers or other signals.

LPC is a software-compatible substitute for the obsolete industry standard architecture (ISA) bus. However, LPC is designed to include far fewer pins than ISA. One original purpose of LPC was to enable a system basic input/output system (BIOS) to be stored in a single chip connected to the LPC bus.

In certain existing systems, a separate out-of-band PECI bus 310 may be provided between EC 110 and processor 210. This separate PECI bus 310 may be a single out of band wire that EC 110 can use to signal processor 210, particularly with respect to environmental control conditions, such as an overheating processor or other thermal condition.

In certain embodiments, PECI bus 310 may operate at a low clock speed, such as 1 MHz. PECI bus 310 may also utilize a complicated level shifter to match voltages between EC 110 and processor 210. Thus, while PECI bus 310 provides a necessary system function for certain systems, it may complicate routing, may be slow, and may utilize additional circuitry for the voltage matching.

FIG. 4 is a block diagram of selected components of an alternative embodiment wherein the separate PECI bus may be eliminated. Advantageously, this eliminates a trace from motherboard 100, thus simplifying routing, or allowing for additional routing possibilities. This may also eliminate additional circuitry, such as the level shifter, and may consume less power. In this example, rather than use legacy LPC, EC 110 and PCH 130 communicate via enhanced serial peripheral interface (eSPI) bus 410.

eSPI is a relatively new bus interface suitable for both client and server platforms that was developed to address certain limitations to the legacy LPC bus. For example, LPC included 7 required pins and 6 optional pins, so that 13 total pins were required to fully implement it. LPC was also limited to 33 MHz, with a limited bandwidth of 133 Mbps. This has become a challenge in dealing with very high-speed peripheral interfaces, such as PCIe and USB version 3.

eSPI is designed around a master-slave architecture. The eSPI master dictates the flow of commands and data between the master and one or more eSPI slaves. To control this, the master has access to a ChipSelect # pin for each eSPI slave. Only one ChipSelect # may be asserted at one time, thus ensuring that transactions can flow only between the master (in this case, PCH 130) and one slave (in this case, EC 110).

As illustrated in this figure, eSPI also includes an n-bit I/O bus, Alert # pin, and Reset # pin. The function of the Alert # pin in particular will be further discussed below.

eSPI provides certain functionality that enables EC 110 to tunnel a PECI command to processor 210 via the eSPI bus. Specifically, the eSPI protocol permits a slave to flag a packet as "out of band" (OOB), which indicates that the attached packet should be treated as an out-of-band communication (of the type previously provided by a separate OOB wire).

Figure 5:
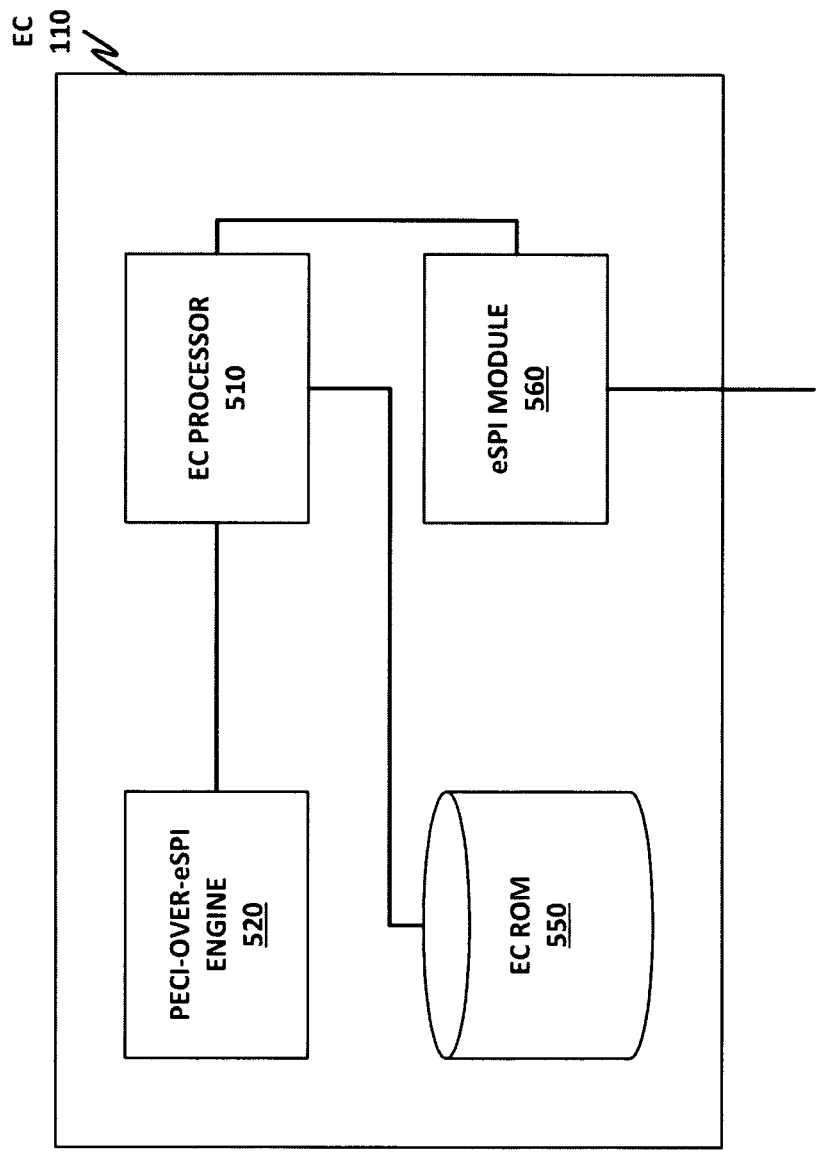
FIG. 5 is a block diagram of selected elements of an embedded controller according to one or more examples of the present specification.

FIG. 5 is a block diagram of an embedded controller 110 according to one or more examples of the present specification. In this example, for simplicity and for illustration of certain key operational components, only selected portions and functions of EC 110 are disclosed.

Specifically, EC processor 510 may be provided, which may be any suitable processor according to the definitions disclosed herein. In one common example, EC processor 510 is a simplified microcontroller that is programmable. In other examples, an ASIC, FPGA, or any other suitable processor type may also be used.

In this example, and EC ROM 550 is provided, which may be a nonvolatile storage medium having stored thereon executable instructions for providing the EC functionality, including logic for acting as an eSPI slave. These may include instructions for providing PECI-over-eSPI tunneling as illustrated herein. In some examples, EC 110 may include a separate EC memory, which may be a RAM or other suitable memory, while in other cases, some memory functionality may be combined with EC ROM 550. Thus, the architecture illustrated here should be understood to be a nonlimiting example. It should be noted that in certain embodiments, an ASIC or FPGA program to perform a certain function may also be considered to be a nonvolatile computer readable storage medium, wherein the hardware instructions themselves are the programmable instructions.

EC 110 also includes an eSPI module 560, which is provided to communicatively couple EC 110 to an eSPI bus 410. ESPI module 360 may be or comprise any suitable combination of hardware and/or software provided to communicatively couple eSPI EC processor 510 to an eSPI bus 410. This could include wires to make the physical connection, as well as executable instructions for providing the communication consistent with the eSPI specification. However, this should be understood to be a nonlimiting example, and other configurations are possible.

EC 110 also includes a PECI-over-eSPI engine 520, which may be an engine according to this specification, and includes the hardware and/or software for providing the PECI-over-eSPI tunneling functions described in this specification. For example, PECI-over-eSPI engine 520 may include logic for encapsulating a PECI command into an eSPI OOB packet, and for notifying PCH 130 that the packet is available.

PECI-over-eSPI engine 520 may also include logic for receiving a PECI response as part of an eSPI OOB packet received from PCH 130. These functions should be understood to be nonlimiting examples of PECI-over-eSPI engine 520.

Figure 6:
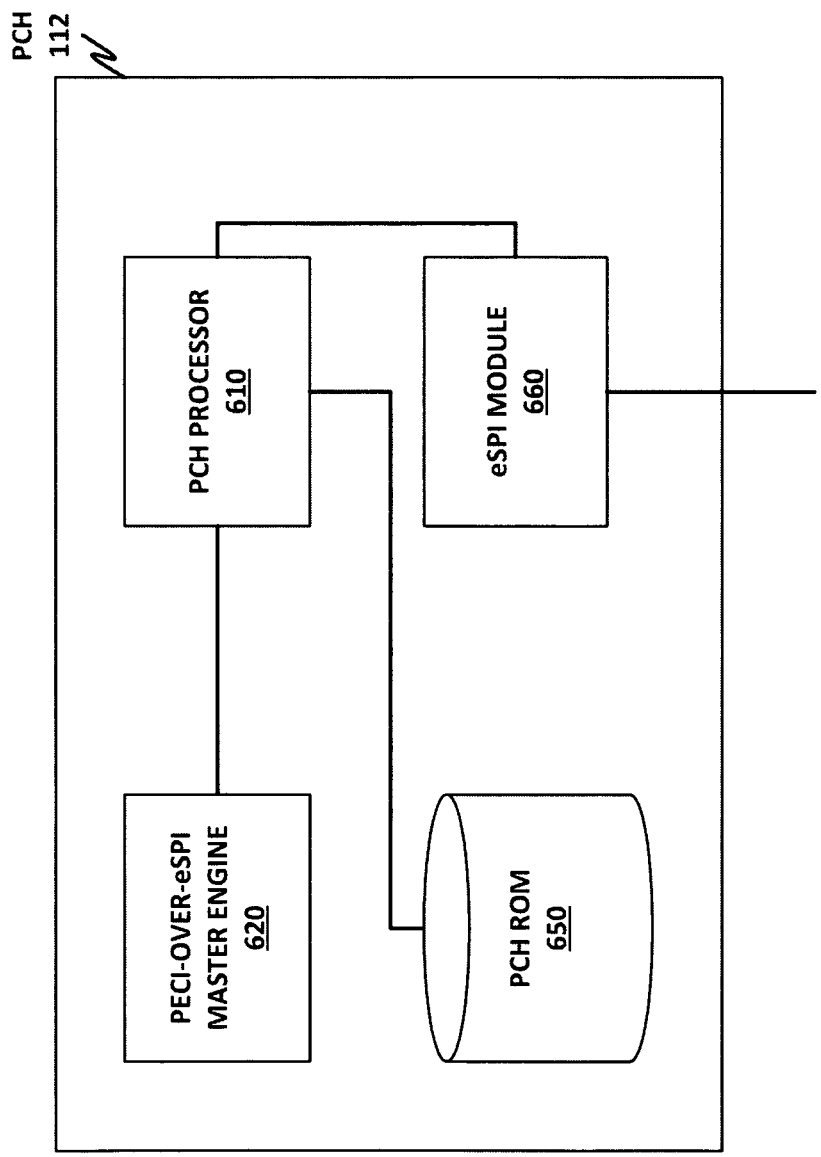
FIG. 6 is a block diagram of selected elements of a PCH according to one or more examples of the present specification.

FIG. 6 is a block diagram of selected elements of a PCH 130 according to one or more examples of the present specification. For the purpose of simplicity, and to provide a focused illustration, only selected elements of PCH 130 are disclosed.

Specifically, in this example, PCH processor 610 is provided. PCH processor 610 may be any suitable processor according to the definitions in this specification. In a common example, PCH processor 610 is a simplified embedded programmable microcontroller, although in other examples other controllers such as an ASIC or FPGA may be provided.

In cases where PCH processor 610 is programmable, a PCH ROM 650 may be provided. PCH ROM 650 may be a nonvolatile storage medium having stored thereon executable instructions for providing certain functions to PCH processor 610. As above, other embodiments are possible, including instructions programmed directly into an ASIC or FPGA.

In this example, PCH 130 includes an eSPI module 660. eSPI module 660 may be any combination of hardware or software provided to program to enable PCH 130 to communicatively couple to eSPI bus 410 and function as an eSPI master, as described herein. This may include, for example, one or more wires to physically couple PCH 130 to eSPI bus 410, as well as logic for providing the communication functions over eSPI bus 410.

PCH 130 also includes in this example a PECI-over-eSPI master engine 620. PECI-over-eSPI master engine 620 is provided to illustrate that PCH 130 may be an eSPI master device. PECI-over-eSPI master engine 620 may be provided to carry out certain functions and methods according to the present specification, including for example receiving from EC 110 a notification that an OOB packet is available. PCH 130 may fetch the OOB packet from EC 110, and may inspect the OOB packet to determine that it is a PECI over eSPI message that is to be tunneled to processor 210. PECI-over-eSPI master engine 620 may then either provide the message as-is to processor 210, or as appropriate to the embodiment, may reformat the message before sending it to processor 210.

After sending the message to processor 210, PCH 130 may later receive a response from processor 210. As before, after receiving the response, PECI-over-eSPI master engine 620 may reformat the packet if necessary, and may then provide the packet to EC 110. In an example, providing the packet response packet to EC 110 comprises reformatting the packet as an eSPI OOB response packet, and using the PUT_OOB function of the eSPI bus to provide the packet to EC 110.

Figure 7:
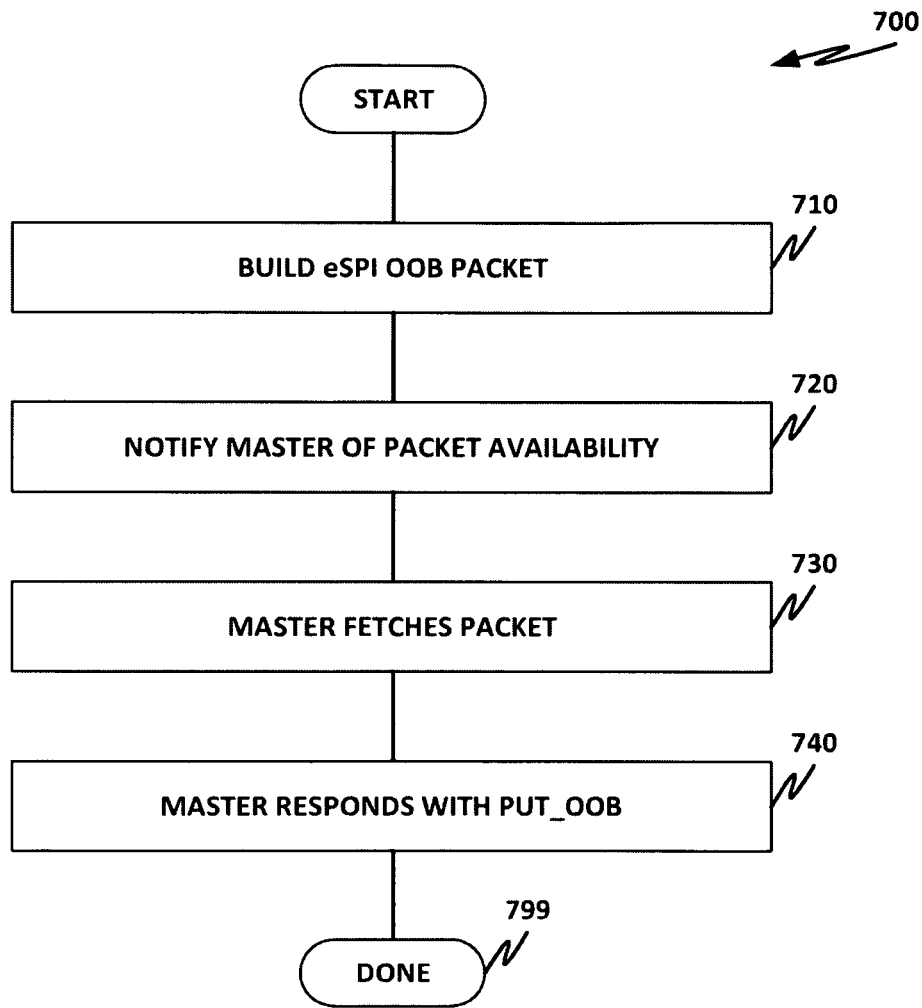
FIG. 7 is a flow chart of a method performed by an EC according to one or more examples of the present specification.

FIG. 7 is a flowchart of a method 700 performed by EC 110 according to one or more examples of the present specification.

In block 710, EC 110 may engage in a PECI exchange with processor 210, such as notifying processor 210 of the current temperature delta. As discussed herein, in certain embodiments, the separate out-of-band PECI bus may have been removed. Thus, to engage in the PECI exchange with processor 210, EC 110 first builds an eSPI out of band (OOB) packet. This packet may be in any suitable format, such as a packet having an eSPI header, with the with a PECI payload. An example format follows:

| 7 | 6 | 5 | 4 | 3 | 2 | 1 | 0 | |
|---|---|---|---|---|---|---|---|---|
| eSPI Cycle Type: OOB Message = 21 h | | | | | | | | |
| Tag[3:0] | | | | Length[11:8] = 0 h | | | | |
| Length[7:0] = N + 3 | | | | | | | | |
| Dest Slave Addr[7:1] = 10 h (PCH) | | | | | | | | 0 |
| Command Code = 01 h (PECI Command) | | | | | | | | |
| Byte Count = N | | | | | | | | |
| Source Slave Address [7:1] = 0Fh (eSPI Slave O/EC) | | | | | | | | 1 |
| PECI Target Address | | | | | | | | |
| Write Length | | | | | | | | |
| Read Length | | | | | | | | |
| 1$^{st}$ Data (Command) | | | | | | | | |
| 2$^{nd}$ Data (Optional Host ID & Retry) | | | | | | | | |
| ... | | | | | | | | |
| Last Data (Optional AW FCS) | | | | | | | | |

In block 720, EC 110 notifies PCH 130, serving as the eSPI master device, that the packet is available. Note that in certain embodiments, EC 110 as the eSPI slave device is not entitled to actually push data out onto the bus. Rather, it is merely entitled to notify the eSPI master that it has data available.

In an embodiment, this may be accomplished with the eSPI Alert # pin. In an example Alert # transaction, the slave (EC 110) writes a datum to its transmit queue and asserts its Alert # pin. When that slave is next active, the master (PCH 130) sends a GET_STATUS command. EC 110 responds with a GET_STATUS_RESPONSE indicating that it has data available in its Tx buffer.

It is then up to the eSPI master to fetch the data from the eSPI slave. Thus, in block 770, PCH 130 fetches the OOB packet from EC 110.

Optionally, EC 110 may then wait to receive a response from processor 210. Once the processor has responded, in block 740, the eSPI master device, in this case PCH 130, may use the PUT_OOB function to provide the response to EC 110. Once the response is received, then a full PECI notification cycle has occurred with processor 210. Advantageously, this has been provided out of band of the operating system, and in some examples at a much greater clock speed then with the legacy PECI bus.

In block 799, the method is done.

Figure 8:
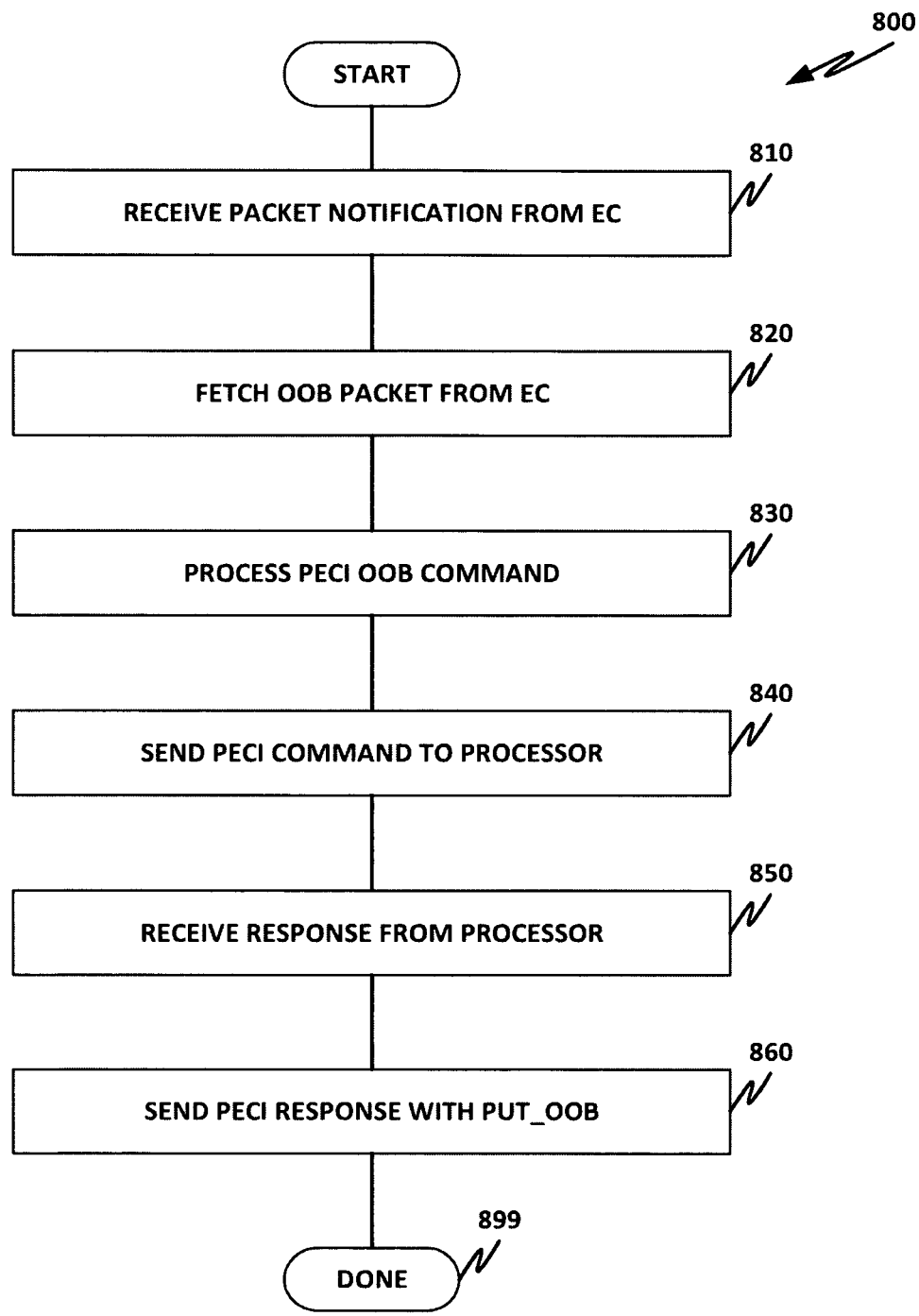
FIG. 8 is a flow chart of a method performed by a PCH according to one or more examples of the present specification.

FIG. 8 is a flowchart of a method 800 performed by an eSPI master, such as PCH 130, according to one or more examples of the present specification.

In block 810, PCH 130 receives from an eSPI slave device, such as EC 110, a notification that an OOB packet is available. For example, this may occur when PCH 130 asserts the ChipSelect # pin for that slave, and sees that its Alert # pin is active. After a GET_STATUS exchange, PCH 130 determines that EC 110 has an OOB packet in its Tx buffer.

In block 820, PCH 130 fetches the OOB packet from EC 110, for example, by reading out the Tx buffer of EC 110.

In block 830, PCH 130 processes the PECI OOB command. This may comprise, for example, inspecting the OOB packet and determining that it is a PECI command. PCH 130 may then perform any additional processing that is necessary to process the OOB command. In some examples, this may include reformatting the OOB packet so that it is suitable for sending to the processor. In other embodiments, the packet is sent as-is.

In block 840, PCH 130 sends the PECI command to processor 210.

After the processor receives and acknowledges the PECI command, it may send a response back. Thus, in block 850, processor 210 sends the response back, and PCH 130 receives the response from processor 210.

In block 860, if necessary, PCH 130 may reformat the OOB packet in preparation for sending it back to EC 110, or perform any other processing necessary. In other examples, the packet may be provided as is. An example PECI response is as follows:

| 7 | 6 | 5 | 4 | 3 | 2 | 1 | 0 | |
|---|---|---|---|---|---|---|---|---|
| eSPI Cycle Type: OOB Message = 21 h | | | | | | | | |
| Tag[3:0] | | | | Length[11:8] = 0 h | | | | |
| Length[7:0] = M + 3 | | | | | | | | |
| Dest. Slave Addr. [7:1] = 0Fh (eSPI Slave 0/EC) | | | | | | | | 0 |
| Command Code = 01 h (PECI Command) | | | | | | | | |
| Byte Count = M | | | | | | | | |
| Source Slave Address [7:1] = 10 h (PCH) | | | | | | | | 1 |
| PECI Response/Error Status | | | | | | | | |
| 1$^{st}$ Data (Optionally PECI Completion Code) | | | | | | | | |
| 2$^{nd}$ Data | | | | | | | | |
| ... | | | | | | | | |
| Last Data | | | | | | | | |

In block 860, PCH 130 sends the response to EC 110 as illustrated in this specification. As described above, this may be accomplished in some embodiments with the PUT_OOB command. This makes the packet available to EC 110.

In block 899, the method is done.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

There is disclosed in one example, an embedded controller for a computer, comprising: a processor; first one or more logic elements comprising a serial peripheral interface (SPI) module to communicatively couple the embedded controller to an SPI bus as an SPI slave; second one or more logic elements comprising a platform environment control interface (PECI)-over-SPI engine, to: build an SPI packet comprising an encapsulated PECI command; and send a notification to an SPI master that the packet is available.

There is further disclosed an example, wherein the SPI bus is an enhanced SPI (eSPI) bus.

There is further disclosed an example, wherein the packet is an eSPI out-of-band (OOB) packet.

There is further disclosed an example, wherein the OOB packet comprises an eSPI header and a PECI OOB payload.

There is further disclosed an example, wherein the PECI-over-SPI engine is further to receive a PECI response via the SPI bus.

There is further disclosed an example, wherein the PECI response comprises an SPI header and a PECI response payload.

There is further disclosed in an example, a platform controller hub (PCH), comprising: a processor; an SPI network module to communicatively couple the PCH to a serial peripheral interface (SPI) bus as an SPI master; and a platform environment control interface (PECI)-over-SPI master engine to: receive via the SPI bus a notification that an encapsulated PECI packet is ready on an SPI slave; fetch the encapsulated PECI packet from the SPI slave via the SPI bus; and send the encapsulated PECI packet to a processor via the SPI bus.

There is further disclosed an example, wherein the PECI-over-Platform controller hub engine is further to: receive a PECI response from the processor; and send the response packet to the SPI slave via the SPI bus.

There is further disclosed an example, wherein the PECI-over-Platform controller hub engine is to reformat the response packet before forwarding it to the EC.

There is further disclosed an example, wherein reformatting the packet comprises reformatting it into a format comprising an SPI header and an out-of-band PECI response payload.

There is further disclosed an example, wherein the SPI bus is an enhanced SPI (eSPI) bus.

There is further disclosed an example, wherein the encapsulated PECI packet is an eSPI out-of-band (OOB) packet.

There is further disclosed an example, wherein the OOB packet comprises an SPI header and a PECI OOB payload.

There is further disclosed in an example, at least one machine accessible storage medium having code stored thereon, the code when executed on a machine, causes the machine to: communicatively couple an embedded controller to a serial peripheral bus (SPI) bus as an SPI slave; build an SPI packet comprising an encapsulated platform environment control interface (PECI) command; and send a notification to an SPI master that the packet is available.

There is further disclosed an example, wherein the SPI bus is an enhanced SPI (eSPI) bus.

There is further disclosed an example, wherein the packet is an eSPI out-of-band (OOB) packet.

There is further disclosed an example, wherein the OOB packet comprises an eSPI header and a PECI OOB payload.

There is further disclosed an example, wherein the code further instructs the machine to receive a PECI response via the SPI bus.

There is further disclosed an example, wherein the PECI response comprises an SPI header and a PECI response payload.

There is further disclosed in an example, at least one machine accessible storage medium having code stored thereon, the code when executed on a machine, causes the machine to: communicatively couple a platform controller hub (PCH) to a serial peripheral interface (SPI) bus as an SPI master; receive via the SPI bus a notification that an encapsulated platform environment control interface (PECI) packet is ready on an SPI slave; fetch the encapsulated PECI packet from the SPI slave via the SPI bus; and send the encapsulated PECI packet to a processor via the SPI bus.

There is further disclosed an example, wherein the code further causes the machine to: receive a PECI response from the processor; and send the response packet to the SPI slave via the SPI bus.

There is further disclosed an example, wherein the code further causes the machine to reformat the response packet before forwarding it to the EC.

There is further disclosed an example, wherein reformatting the packet comprises reformatting it into a format comprising an SPI header and an out-of-band PECI response payload.

There is further disclosed an example, wherein the SPI bus is an enhanced SPI (eSPI) bus.

There is further disclosed an example, wherein the encapsulated PECI packet is an eSPI out-of-band (OOB) packet.

There is further disclosed an example, wherein the OOB packet comprises an SPI header and a PECI OOB payload There is further disclosed an example of a method of providing any of the foregoing engines, comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. An embedded controller for a computer, comprising:
a processor;
first one or more logic elements comprising a serial peripheral interface (SPI) module to communicatively couple the embedded controller to an SPI bus as an SPI slave;
second one or more logic elements comprising a platform environment control interface (PECI)-over-SPI engine, to:
build an SPI packet comprising an encapsulated PECI command; and
send a notification to an SPI master that the packet is available.

2. The embedded controller of claim 1, wherein the SPI bus is an enhanced SPI (eSPI) bus.

3. The embedded controller of claim 2, wherein the packet is an eSPI out-of-band (OOB) packet.

4. The embedded controller of claim 3, wherein the OOB packet comprises an eSPI header and a PECI OOB payload.

5. The embedded controller of claim 1, wherein the PECI-over-SPI engine is further to receive a PECI response via the SPI bus.

6. The embedded controller of claim 5, wherein the PECI response comprises an SPI header and a PECI response payload.

7. A platform controller hub (PCH), comprising:
a processor;
an SPI network module to communicatively couple the PCH to a serial peripheral interface (SPI) bus as an SPI master; and
a platform environment control interface (PECI)-over-SPI master engine to:
receive via the SPI bus a notification that an encapsulated PECI packet is ready on an SPI slave;
fetch the encapsulated PECI packet from the SPI slave via the SPI bus; and
send the encapsulated PECI packet to a processor via the SPI bus.

8. The platform controller hub of claim 7, wherein the PECI-over-Platform controller hub engine is further to:

receive a PECI response from the processor; and send the response packet to the SPI slave via the SPI bus.

9. The platform controller hub of claim 8, wherein the PECI-over-Platform controller hub engine is to reformat the response packet before forwarding it to an embedded controller (EC).

10. The platform controller hub of claim 9, wherein reformatting the packet comprises reformatting it into a format comprising an SPI header and an out-of-band PECI response payload.

11. The platform controller hub of claim 7, wherein the SPI bus is an enhanced SPI (eSPI) bus.

12. The platform controller hub of claim 11, wherein the encapsulated PECI packet is an eSPI out-of-band (OOB) packet.

13. The platform controller hub of claim 12, wherein the OOB packet comprises an SPI header and a PECI OOB payload.

14. At least one non-transitory machine accessible storage medium having code stored thereon, the code when executed on a machine, causes the machine to:

communicatively couple an embedded controller to a serial peripheral bus (SPI) bus as an SPI slave;

build an SPI packet comprising an encapsulated platform environment control interface (PECI) command; and send a notification to an SPI master that the packet is available.

15. The at least one machine accessible storage medium of claim 14, wherein the SPI bus is an enhanced SPI (eSPI) bus.

16. The at least one machine accessible storage medium of claim 15, wherein the packet is an eSPI out-of-band (OOB) packet.

17. The at least one machine accessible storage medium of claim 16, wherein the OOB packet comprises an eSPI header and a PECI OOB payload.

18. The at least one machine accessible storage medium of claim 14, wherein the code further instructs the machine to receive a PECI response via the SPI bus.

19. The at least one machine accessible storage medium of claim 18, wherein the PECI response comprises an SPI header and a PECI response payload.

20. At least one machine accessible storage medium having code stored thereon, the code when executed on a machine, causes the machine to:

communicatively couple a platform controller hub (PCH) to a serial peripheral interface (SPI) bus as an SPI master;

receive via the SPI bus a notification that an encapsulated platform environment control interface (PECI) packet is ready on an SPI slave;

fetch the encapsulated PECI packet from the SPI slave via the SPI bus; and send the encapsulated PECI packet to a processor via the SPI bus.

21. The at least one machine accessible storage mediums of claim 20, wherein the code further causes the machine to:

receive a PECI response from the processor; and send the response packet to the SPI slave via the SPI bus.

22. The at least one machine accessible storage mediums of claim 21, wherein the code further causes the machine to reformat the response packet before forwarding it to an embedded controller.

23. The at least one machine accessible storage mediums of claim 22, wherein reformatting the packet comprises reformatting it into a format comprising an SPI header and an out-of-band PECI response payload.

24. The at least one machine accessible storage mediums of claim 20, wherein the SPI bus is an enhanced SPI (eSPI) bus.

25. The at least one machine accessible storage mediums of claim 24, wherein the encapsulated PECI packet is an eSPI out-of-band (OOB) packet.

26. The at least one machine accessible storage mediums of claim 25, wherein the OOB packet comprises an SPI header and a PECI OOB payload.

\* \* \* \* \*